United States Patent [19]

Kitagishi

[11] Patent Number: 4,752,121
[45] Date of Patent: Jun. 21, 1988

[54] ZOOM LENS

[75] Inventor: Nozomu Kitagishi, Tokyo, Japan

[73] Assignee: Canon Kabushiki Kaisha, Tokyo, Japan

[21] Appl. No.: 14,151

[22] Filed: Feb. 12, 1987

Related U.S. Application Data

[63] Continuation of Ser. No. 511,669, Jul. 7, 1983, abandoned.

[30] Foreign Application Priority Data

Jul. 17, 1982 [JP] Japan .................................. 57-124765

[51] Int. Cl.$^4$ .......................... G02B 9/64; G02B 13/12
[52] U.S. Cl. ..................................... 350/427; 350/423
[58] Field of Search .......................... 350/423, 427, 428

[56] References Cited

U.S. PATENT DOCUMENTS

| | | | |
|---|---|---|---|
| 2,741,947 | 4/1956 | Back | 350/423 |
| 3,682,534 | 8/1972 | Cook et al. | 350/427 |
| 3,924,934 | 12/1975 | Grey | 350/427 |
| 3,970,366 | 6/1976 | Sekiguchi | 350/427 |
| 4,460,251 | 7/1984 | Okudaira | 350/427 |

Primary Examiner—John K. Corbin
Assistant Examiner—P. M. Dzierzynski
Attorney, Agent, or Firm—Toren, McGeady & Associates

[57] ABSTRACT

A zoom lens having at least three components, or, from front to rear, a first component of positive refractive power, a second component for variation of the image magnification, and a third component for image shift compensation, wherein said first lens component is constructed from a front group of lens elements $1_A$ of positive refractive power and a rear group of lens elements $1_B$ of negative refractive power, thereby letting $f_A$ and $f_B$ denote the focal lengths of said front and rear lens groups respectively, the following condition is satisfied:

$$1.5f_A < |f_B| < 4f_A$$

and said rear lens group $1_B$ is made movable for focusing.

15 Claims, 8 Drawing Sheets

ZOOM LENS

This is a continuation of application Ser. No. 511,669, filed July 7, 1983 now abandoned.

BACKGROUND OF THE INVENTION

1. Field of the Invention

This invention relates to zoom lenses, and more particularly to zoom lenses having the focusing provision in part of lens components which remain stationary during zooming.

2. Description of the Prior Art

In conventional zoom lens having a variator preceded by a focusing component, the characteristics that the once-established in-focus condition is not broken by any subsequent zooming operation, and that, in any zooming position, focusing is effected by a predetermined amount of forward movement for a certain object distance have been enjoyed.

As compared with this, other focusing methods by moving one of the components that follows the variator have to differentiate the amount of forward movement of the focusing component depending upon the zooming position despite a constant object distance. Therefore the focusing control or cam mechanism tended to be complicated in structure.

For this reason, many zoom lenses have the focusing provision made at a component in front of the variator, or, for example, the first component counting from front.

This focusing arrangement is, however, accompanied with the following disadvantages:

(1) Since the diameter of the first component is generally large, and its weight is also heavy, the operativity when in focusing becomes bad.

(2) As the first component moves forward to effect focusing down to shorter object distances, the total length of the entire lens system becomes longer, and the weight balance gets worse. (3) When the first component is driven to move by automatic focusing mechanism, the driving system must be of high torque, making it difficult to operate the focusing system quickly with high accuracy.

To avoid these, a proposal has been made that the front or first component is divided into two parts of which the rear part only is moved to effect focusing, namely, the so-called inner focusing method, as, for example, disclosed in Japanese Laid-Open patent applications Sho Nos. 52-109952, 55-57815 and 55-117119 and U.S. Pat. Nos. 3,598,476, 4,110,006 and 4,099,845.

In those lens system employing the inner focusing method, from the standpoint of aberration correction, the first component is made constructed in a considerably complicated form, and has a considerably heavy weight.

In Japanese Pat. Publication Sho No. 52-41068, it is proposed that the first lens component is constructed with two lens groups of negative and positive powers, and the rear or positive lens group is made movable for focusing.

This focusing method when applied to the positive lead type of zoom lenses where the front lens group is of positive refractive power, produces the following drawbacks:

(4) Since the first component is of positive refractive power, letting $f_I$ denote the focal length of the first component, and $f_{IA}$ and $f_{IB}$ the focal lengths of the front and rear lens groups of negative and positive powers respectively, we have the following approximate equation:

$$f_I = f_{IA} = f_{IB}$$

At this time, $f_I > f_{IA}$ and $|f_{IB}| > f_{IA}$ are given. Therefore, the focal length $f_{IB}$ of the focusing lens group becomes small, making it difficult to assure good correction of aberrations throughout the focusing range. Also from the aspect of production, high precision techniques are required.

(5) In order that the rear lens group of positive power admits of the diverged light pencil by the front or negative lens group, the diameter of the rear lens group is necessarily increased.

SUMMARY OF THE INVENTION

It is an object of the present invention to provide a zoom lens having its total length maintained unchanged against focusing with achievement of simplifying the movable lens group for focusing, while still permitting good correction of aberrations.

To achieve this, the feature of the invention is the design of the zoom lens in such a way that the lens system has at least three components, or, from front to rear, a first component of positive refractive power, a second component for variation of image magnification, and a third component for compensating for the image shift resulting from the change of the image magnification, Wherein said first lens component is constructed from a $1_A$-th lens group of positive refractive power and a $1_B$-th lens group of negative refractive power, whereby letting $f_A$ and $f_B$ denote the focal lengths of said $1_A$-th and $1_B$-th lens groups respectively, the following condition is satisfied:

$$1.5 f_A < |f_B| < 4 f_A \tag{1}$$

and said $1_B$-th lens group is made movable for focusing.

BRIEF DESCRIPTION OF THE DRAWINGS

FIGS. 2-1 through -12 and FIGS. 3-1 through -12 are graphic representations of the various aberrations of the lens of FIG. 1 with an object at infinity and at a distance of 3 meters respectively.

FIGS. 5-1 through -12 and FIGS. 6-1 through -12 are graphic representations of the various aberrations of the lens FIG. 4 with an object at infinity and at a distance of 3 meters respectively.

FIGS. 8-1 through -12 and FIGS. 9-1 through -12 are graphic representations of the various aberrations of the lens of FIG. 7 with an object at infinity and at a distance of 3 meters respectively.

DETAILED DESCRIPTION OF THE PREFERRED EMBODIMENTS

In the zoom lens of the invention, the second and third lens counting from front components movable for zooming are preceded by the first lens component which is divided into two parts of positive and negative powers respectively, of which the rear part or $1_B$-th lens group of negative power is imparted with independent movement for focusing. The employment of such focusing method provides the features that the amount of forward movement of the focusing lens group required to focus on the same object as measured from the position for an infinitely distant object is constant in any zooming position, further that the diameters of the components that follow the $1_B$-th lens group can be reduced, giving an advantage at a minimization of the bulk and size of the complete zoom lens, and that without recouse to an unduly large increase in the negative refractive power, the required focusing range can be formed by a lessened amount of forward movement of the focusing group.

Figure 1:
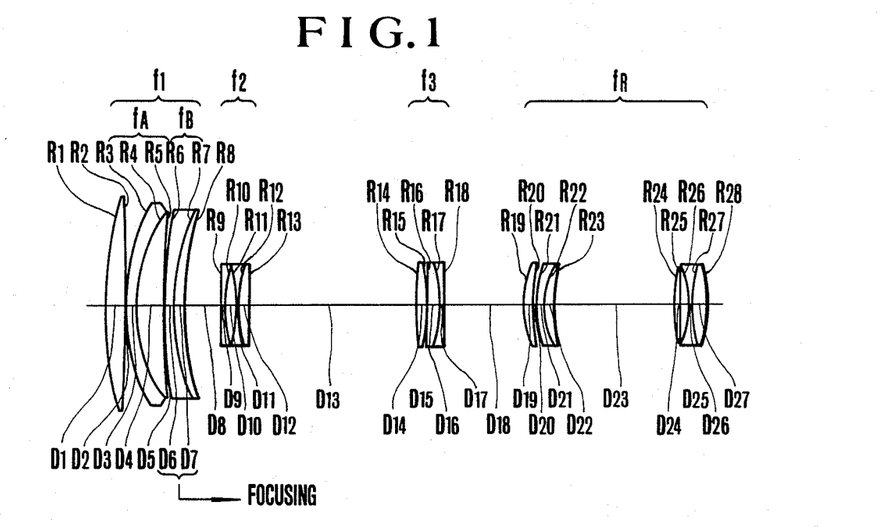
FIGS. 1, 4 and 7 are lens block diagrams of embodiments 1, 2 and 3 of the invention respectively.
Figure 4:
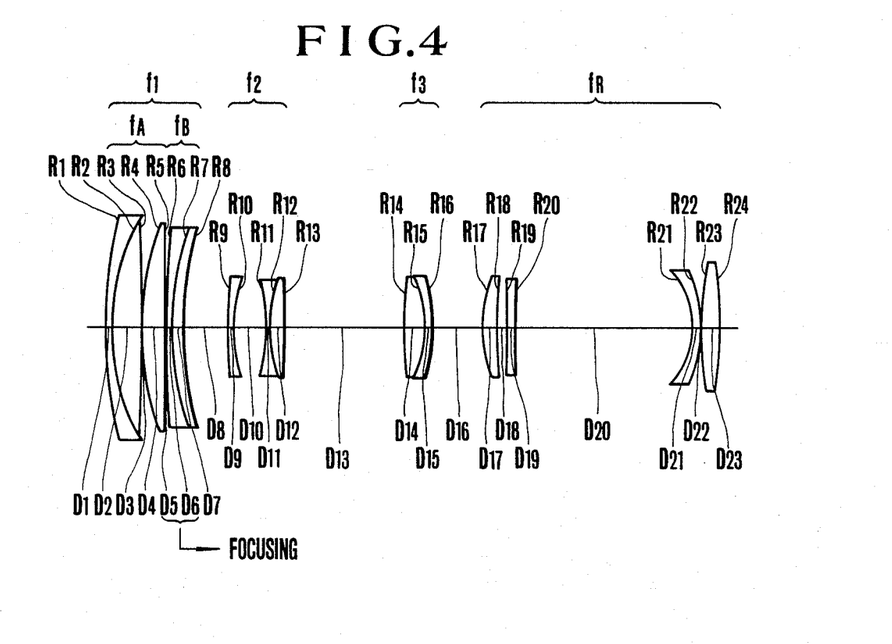
Figure 7:
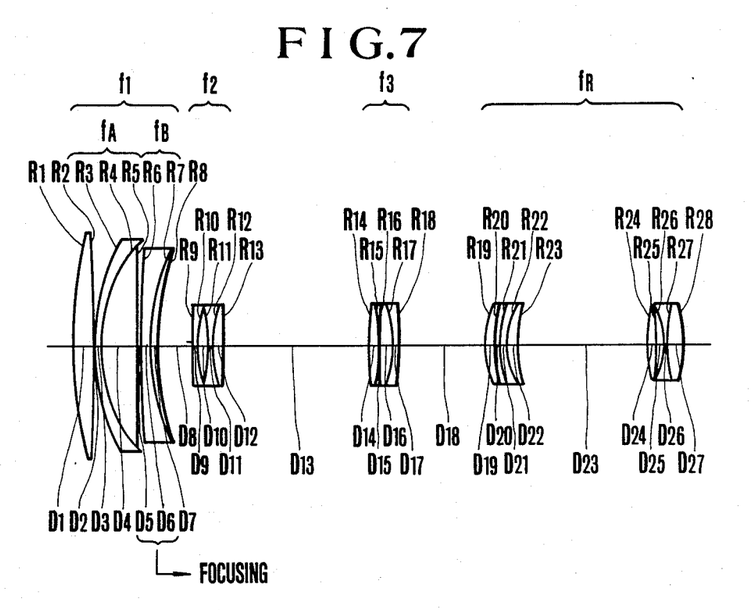
Figure 10:
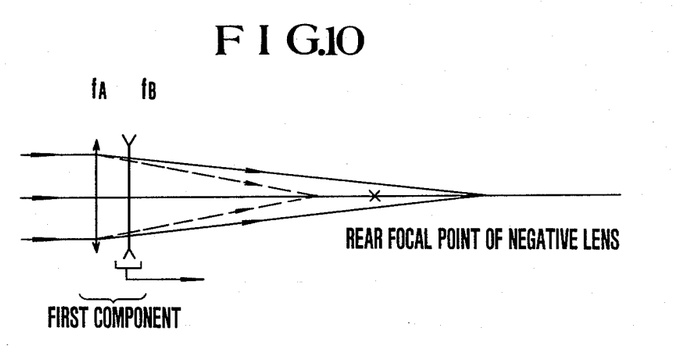
FIG. 10 is a diagram of geometry considered to explain the function of the lens groups constituting part of the zoom lens of the invention.
Figures 21, 22:
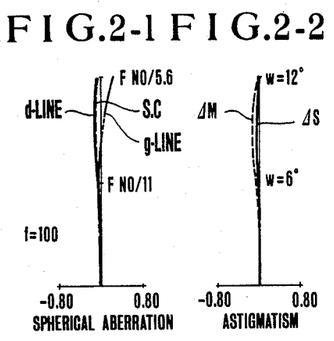
Figure 23:
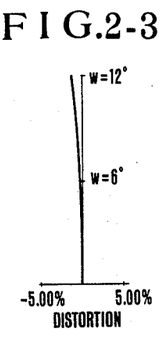
Figure 24:
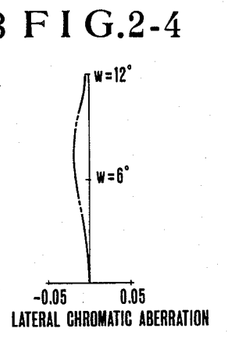
Figure 25:
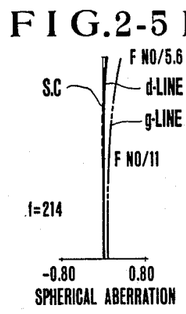
Figure 26:
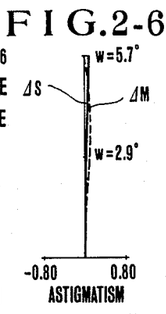
Figure 27:
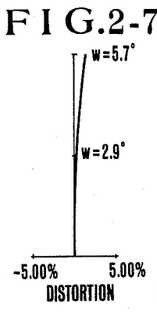
Figure 28:
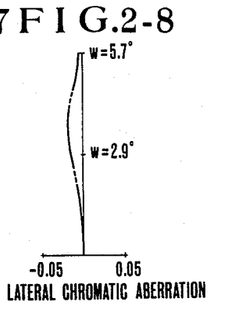
Figure 29:
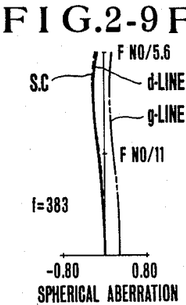
Figure 31:
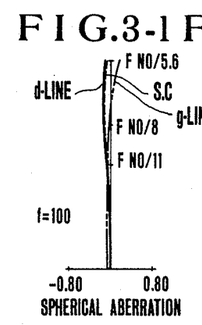
Figure 32:
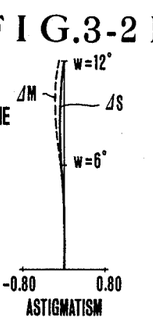
Figure 33:
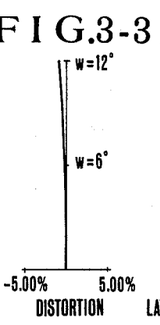
Figure 34:
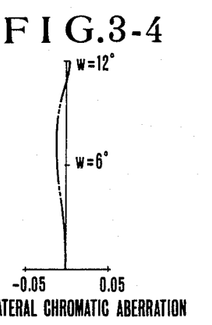
Figure 35:
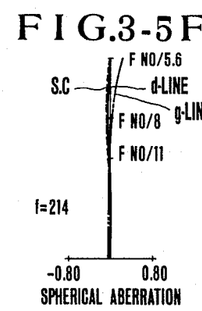
Figure 36:
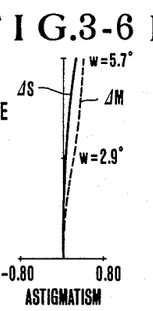
Figure 37:
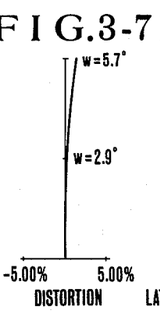
Figure 38:
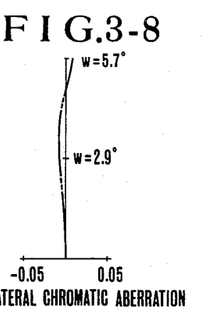
Figure 39:
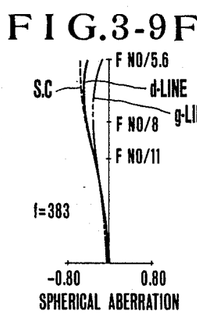
Figure 51:
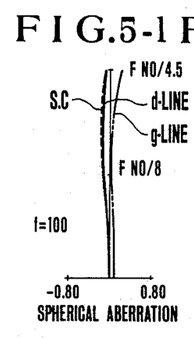
Figure 52:
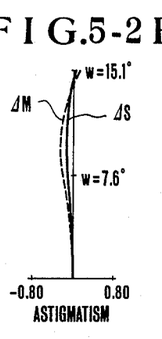
Figure 53:
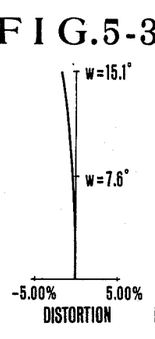
Figure 54:
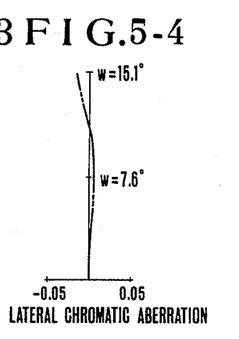
Figure 55:
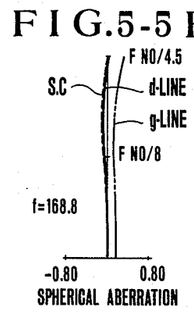
Figure 56:
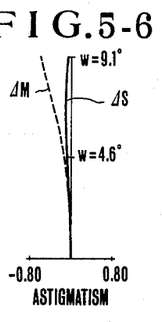
Figures 57, 58:
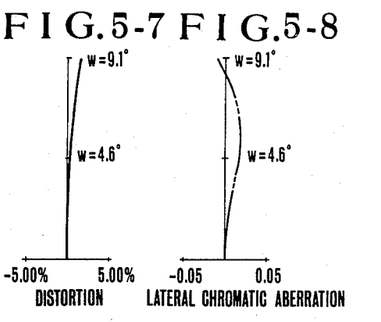
Figure 59:
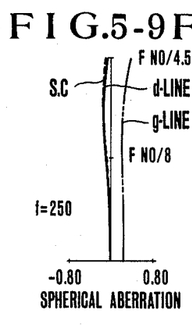
Figures 61, 62, 63, 65, 66, 67:
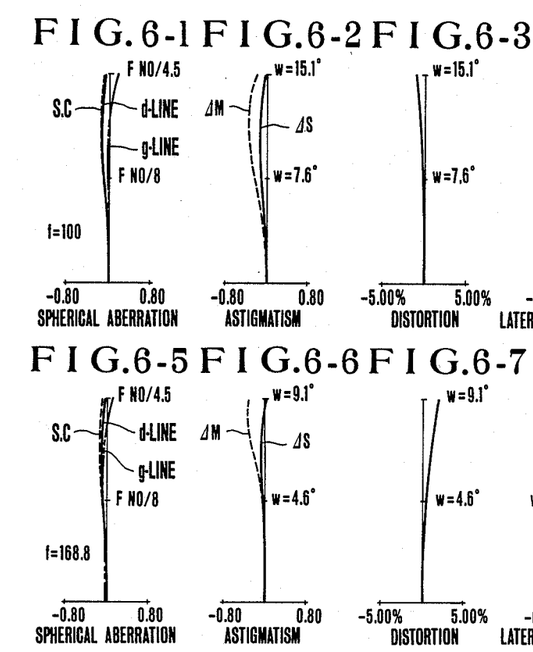
Figure 64:
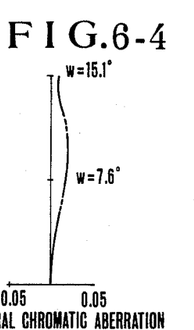
Figure 68:
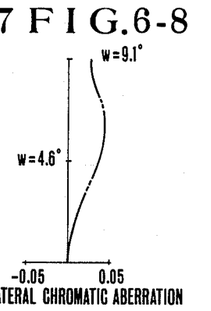
Figure 69:
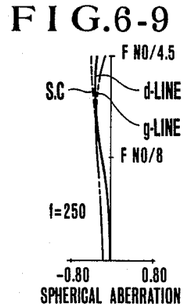
Figure 81:
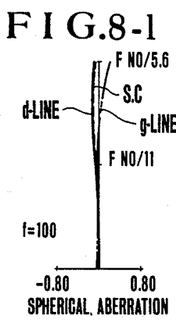
Figure 82:
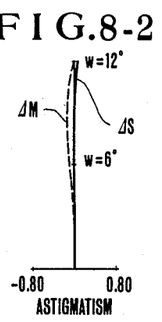
Figures 83, 84:
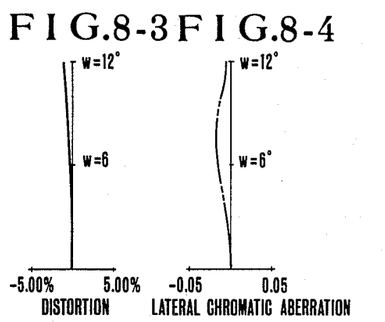
Figure 85:
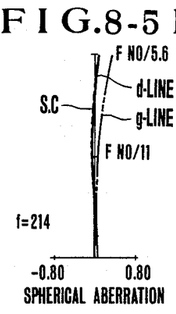
Figure 86:
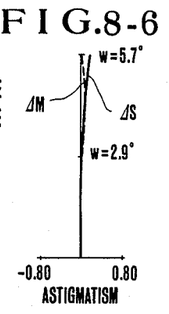
Figures 87, 88:
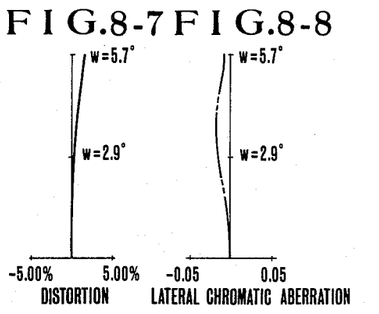
Figure 89:
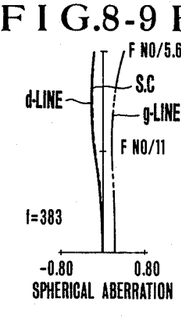
Figure 91:
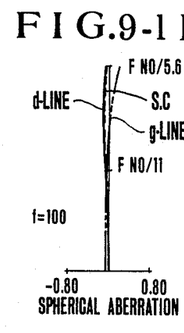
Figure 92:
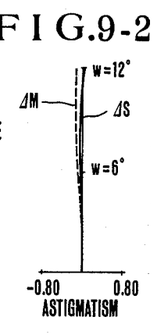
Figure 93:
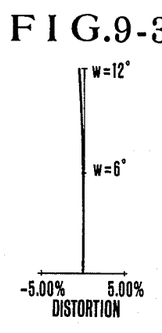
Figure 94:
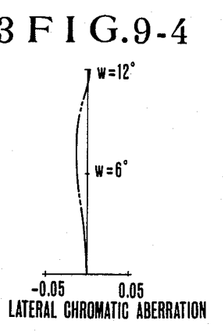
Figure 95:
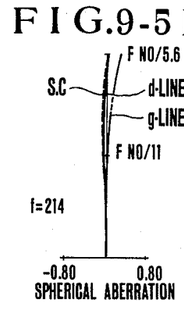
Figure 96:
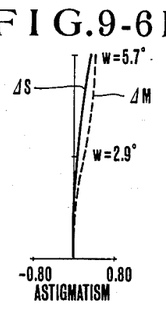
Figure 97:
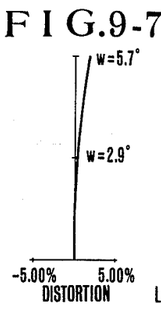
Figure 98:
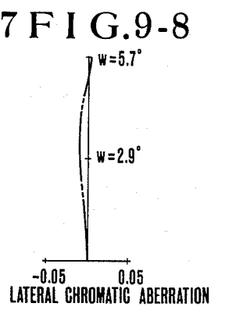
Figure 99:
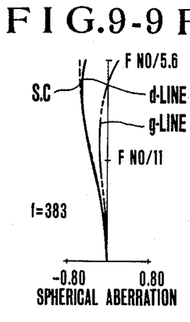
Figure 210:
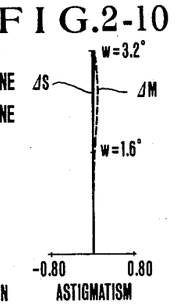
Figure 211:
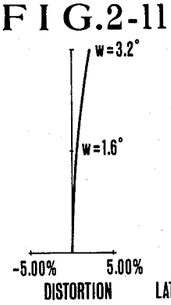
Figure 212:
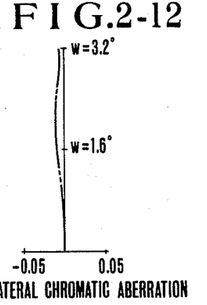
Figure 310:
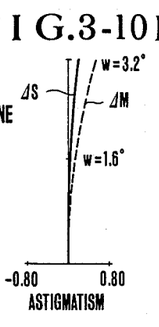
Figure 311:
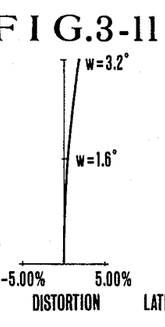
Figure 312:
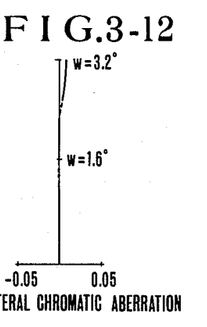
Figure 510:
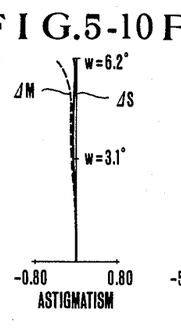
Figures 511, 512:
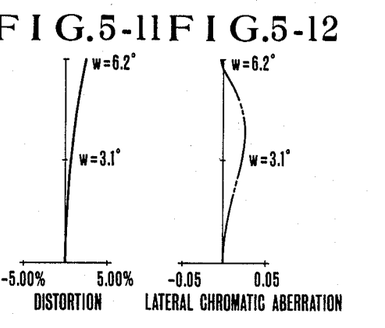
Figure 610:
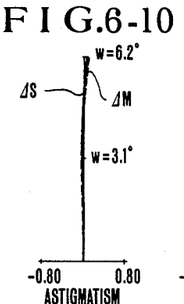
Figures 611, 612:
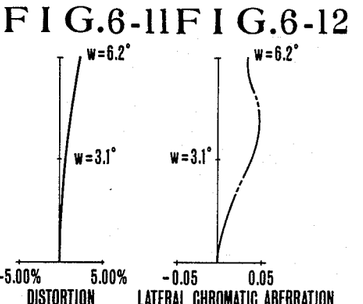
Figure 810:
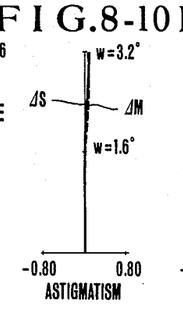
Figures 811, 812:
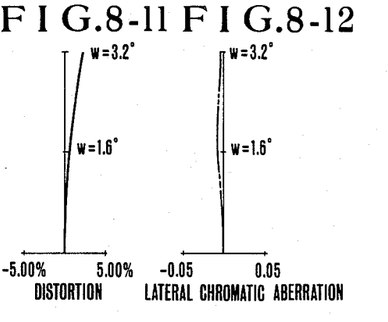
Figure 910:
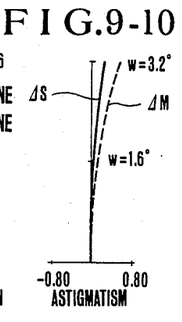
Figures 911, 912:
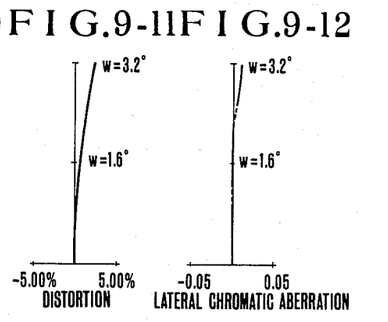

And since the refractive power of the first component is positive, it results that $f_A < |f_B|$. At this time, as illustrated in FIG. 10, the $1_B$-th lens group contributes an enlarging system to the imaging relationship. Therefore, focusing for the required range of variation of the object distance can be effected by a reduced amount of forward movement.

In other words, if the focusing movement is allowed, the refractive power of the $1_b$-th lens group for focusing may be weakened.

Arising from this there are characteristics such as:
(a) The construction and arrangment and form of the elements of the focusing lens group can be simplified.
(b) It becomes easy to reduce the weight of the focusing lens group.
(c) The range of variation of aberrations with focusing can be lessened.
(d) Manufacturing becomes easy.

And, by satisfying the above-stated condition (1), good stability aberration correction throughout the focusing range is achieved.

When the upper limit of the inequalities of condition (1) is exceeded, the total movement of the $1_B$-th lens group is objectionably increased. This calls for an increase in the physical length of the lens and also for an increase in the diameter of the $1_A$-th lens group.

When the lower limit is exceeded, variation of the aberrations with focusing is increased objectionably particularly regarding spherical aberration and astigmatism.

Further, to facilitate a better accomplishment of the object of the invention, it is preferred to satisfy the following conditions:

The $1_A$-th lens group is provided with at least one cemented lens surface or air lens of negative refractive power and has an overall refractive power denoted by $\phi_{AX}$. The $1_A$-th lens group and the $1_B$-th lens group each have at least one positive lens and at least negative lens.

Letting $f_I$ denote the focal length of the first component, $v_{AP}$ the mean value of the Abbe numbers of the glasses of the positive lenses in the $1_A$-th lens group, $v_{AN}$ the mean value of the Abbe numbers of the glasses of the negative lenses in the $1_A$-th lens group, and $r_{Bf}$ and $r_{Br}$ the radii of curvature of the front and rear lens surfaces of the $1_B$-th lens group respectively, the following conditions are satisfied:

$$0.5/f_I < |\phi_{AX}| < 2/f_I \quad (2)$$

$$1.5\, v_{AN} < v_{AP} \quad (3)$$

$$-4 < \frac{r_{Br} + r_{Bf}}{r_{Br} - r_{Bf}} < -0.4 \quad (4)$$

By giving the $1_A$-th lens group the prerequisite of the negative refractive power, good correction of spherical aberration, astigmatism and longitudinal chromatic aberration is maintained in the focusing range.

The inequalities of condition (2) are to assist in achievement of good correction of these aberrations. When the lower limit is exceeded, the residual aberrations of the $1_A$-th lens group are increased. When the upper limit is exceeded, the possibility of producing higher order aberrations is increased, and insufficient correction of spherical aberration in the telephoto positions results.

The inequality of condition (3) is to well correct chromatic aberrations. When this is violated, it becomes difficult to stabilize the chromatic aberrations throughout the focusing range.

The inequalities of condition (4) are to define a proper lens form of the $1_A$-th lens gorup by which the aberrations are stabilized throughout the focusing range. When the upper limit is exceeded, variation with focusing of the spherical aberration and coma is increased. When the lower limit is exceeded, though the range of variation with focusing of the aberrations is lessened, it is objectionable that the spherical aberration is not well corrected for the telephoto positions.

It is to be noted that the zoom section of the second and third components of the zoom lens according to the present invention constitutes an afocal system. With the afocal system of a magnification, r, when followed by an image forming system or fourth component, letting $f_T$ denote the longest focal length of the entire system and $f_R$ the focal length of the fourth component, we have $f_T = rf_R$. To achieve a reduction in the total length of the lens system, it is recommended that the focal length $f_R$ is taken at a small value, and the afocal magnification, r, at a large value.

The afocal magnification in terms of the image magnification, $\beta_{II}$, of the second component and the focal length $f_{III}$ of the third component, is expressed by $r = (f_T/f_{III})\, \beta_{II}$. That the $f_T$ is increased while leaving the image magnification, $\beta_{II}$, of the second component at a constant value, is advantageous in increasing the r, but leads to create a wasteful space between the first and second components, thus hindering the total length of the lens system to be shortened. To minimize this wasteful space, it is preferred that the first component is constructed with positive and negative lens groups as in the present invention, by which the principal point of the first component is shifted toward the front.

As in the above, according to the present invention, a zoom lens of shortened total length while still permitting good stability of aberration correction throughout the focusing range can be realized.

Next, numerical examples of embodiments of the invention are shown. In the numberical examples, Ri is the radius of curvature of the i-th lens surface counting from front, Di is the i-th lens thickness or air separation counting from front, and Ni and $v_i$ are the refractive index and Abbe number of the glass of the i-th lens element counting from front respectively.

In the numerical examples, the Ni and $v_i$ are described consecutively from the above.

| Numerical Example 1 | | | |
| --- | --- | --- | --- |
| Ri | Di | Ni | νi |
| 1  133.12 | 7.11 | 1.51633 | 64.1 |
| 2  −906.29 | 0.30 | 1. | |
| 3   77.24 | 3.04 | 1.80518 | 25.4 |
| 4   53.65 | 10.41 | 1.48749 | 70.1 |
| 5  646.02 | 0.49 | 1. | |
| 6  430.30 | 2.53 | 1.51633 | 64.1 |
| 7   82.53 | 3.73 | 1.59270 | 35.3 |
| 8  115.69 | Variable | 1. | |
| 9  −388.37 | 1.57 | 1.69680 | 55.5 |
| 10   53.83 | 3.10 | 1. | |
| 11  −59.40 | 1.47 | 1.69680 | 55.5 |
| 12   54.26 | 3.43 | 1.80518 | 25.4 |
| 13  −722.70 | Variable | 1. | |
| 14  154.30 | 3.73 | 1.51633 | 64.1 |
| 15  −77.84 | 0.19 | 1. | |
| 16  −824.64 | 4.42 | 1.51633 | 64.1 |
| 17  −50.51 | 1.67 | 1.80610 | 40.9 |
| 18  −189.02 | Variable | 1. | |
| 19   38.72 | 3.51 | 1.61375 | 56.4 |
| 20   74.60 | 1.27 | 1. | |
| 21   50.37 | 1.92 | 1.80518 | 25.4 |
| 22   26.78 | 3.89 | 1.62606 | 39.2 |
| 23   65.44 | 41.63 | 1. | |
| 24   79.68 | 2.92 | 1.51633 | 64.1 |
| 25  −141.74 | 2.10 | 1. | |
| 26  −36.61 | 1.42 | 1.77250 | 49.6 |
| 27   69.94 | 4.37 | 1.67270 | 32.1 |
| 28  −89.73 | | | |

| f: 100 − 383 | | F No: 5.6 | | |
| --- | --- | --- | --- | --- |
| | d8 | d13 | d18 | f |
| Wide Angle Side | 12.677 | 58.264 | 29.021 | 100 |
| Intermediate | 59.776 | 35.229 | 4.957 | 214 |
| Telephoto Side | 78.003 | 1.087 | 20.872 | 383 |

| Numerical Example 2 | | | |
| --- | --- | --- | --- |
| Ri | Di | Ni | νi |
| 1  154.80 | 2.50 | 1.80518 | 25.4 |
| 2   72.83 | 9.00 | 1.61720 | 54.0 |
| 3  −3676.48 | 0.12 | 1. | |
| 4   94.74 | 6.50 | 1.62280 | 57.0 |
| 5  0.15E + 0 | 0.48 | 1. | |
| 6  418.43 | 2.50 | 1.51633 | 64.1 |
| 7   97.16 | 3.75 | 1.59270 | 35.3 |
| 8  120.21 | Variable | 1. | |
| 9  335.34 | 1.50 | 1.71300 | 53.8 |
| 10   49.20 | 9.95 | 1. | |
| 11  −56.14 | 1.50 | 1.71300 | 53.8 |
| 12   59.42 | 3.87 | 1.84666 | 23.9 |
| 13  −2089.67 | Variable | 1. | |
| 14  149.66 | 6.75 | 1.51633 | 64.1 |
| 15  −38.62 | 1.87 | 1.72825 | 28.5 |
| 16  −68.83 | Variable | 1. | |
| 17   44.06 | 5.07 | 1.61272 | 58.7 |
| 18  1081.22 | 2.75 | 1. | |
| 19  −318.37 | 2.25 | 1.80518 | 25.4 |
| 20  439.23 | 56.24 | 1. | |
| 21  −24.98 | 2.25 | 1.78300 | 36.1 |
| 22  −47.79 | 0.12 | 1. | |
| 23  148.29 | 5.62 | 1.60323 | 42.3 |
| 24  −100.86 | | | |

| f: 100 − 250 | | F No: 4.5 | | |
| --- | --- | --- | --- | --- |
| | d8 | d13 | d16 | f |
| Wide Angle Side | 13.649 | 37.782 | 16.212 | 100 |
| Intermediate | 43.271 | 20.702 | 3.67 | 168.8 |
| Telephoto Side | 57.288 | 0.499 | 9.856 | 250 |

| Numerical Example 3 | | | |
| --- | --- | --- | --- |
| Ri | Di | Ni | νi |
| 1  139.09 | 7.07 | 1.51633 | 64.1 |
| 2  −903.63 | 0.19 | 1. | |
| 3   75.05 | 1.96 | 1.80518 | 25.4 |
| 4   52.73 | 0.25 | 1. | |
| 5   52.65 | 11.78 | 1.48749 | 70.1 |
| 6  973.29 | 1.58 | 1. | |
| 7  470.33 | 2.16 | 1.51633 | 64.1 |
| 8   74.28 | 3.24 | 1.59270 | 35.3 |
| 9  109.87 | Variable | 1. | |
| 10  −389.55 | 1.57 | 1.69680 | 55.5 |
| 11   53.95 | 3.46 | 1. | |
| 12  −60.06 | 1.47 | 1.69680 | 55.5 |
| 13   54.48 | 3.43 | 1.80518 | 25.4 |
| 14  −796.30 | Variable | 1. | |
| 15  155.04 | 3.73 | 1.51633 | 64.1 |
| 16  −77.37 | 0.19 | 1. | |
| 17  −697.13 | 4.42 | 1.51633 | 64.1 |
| 18  −50.21 | 1.67 | 1.80610 | 40.9 |
| 19  −183.55 | Variable | 1. | |
| 20   39.58 | 3.51 | 1.61375 | 56.4 |
| 21   77.30 | 1.27 | 1. | |
| 22   49.80 | 1.92 | 1.80518 | 25.4 |
| 23   26.47 | 3.89 | 1.62606 | 39.2 |
| 24   67.58 | 43.47 | 1. | |
| 25   82.22 | 2.92 | 1.51633 | 64.1 |
| 26  −149.39 | 2.13 | 1. | |
| 27  −36.02 | 1.42 | 1.77250 | 49.6 |
| 28   67.04 | 4.37 | 1.67270 | 32.1 |
| 29  −91.14 | 69.49 | 1. | |

| f: 100 − 383 | | F No: 5.6 | | |
| --- | --- | --- | --- | --- |
| | d9 | d14 | d19 | f |
| Wide Angle Side | 12.028 | 58.005 | 29.022 | 100 |
| Intermediate | 59.129 | 34.969 | 4.957 | 214 |
| Telephoto Side | 77.356 | 0.826 | 20.873 | 383 |

What I claim:

1. A zoom lens comprising:
three lens components, said three lens components being, from front to rear, a first lens component of positive refractive power, a second lens component movable for variation of image magnification, and a third component movable for compensating for the image shift resulting from the movement of said second lens component,
and said first lens component having a first sub-component of positive refractive power and a second sub-component of negative refractive power, and satisfying the following condition:

$$1.5 f_A < |f_B| < 4 f_A$$

where $f_A$ and $f_B$ denote the focal lengths of said first sub-component and said second sub-component, said second sub-component being movable to effect focusing.

2. A zoom lens according to claim 1, wherein said second sub-component has at least one positive and at least one negative lens, and the following condition is satisfied:

$$-4 < \frac{r_{Br} + r_{Bf}}{r_{Br} - r_{Bf}} < -0.4$$

where $r_{Bf}$ and $r_{Br}$ denote the radii of curvature of the front and rear lens surfaces of said second sub-component.

3. A zoom lens according to claim 2, wherein said first sub-component has at least one positive lens and negative lens, and said first sub-component has at least one cemented lens surface or air lens of negative refractive power, and the following conditions are satisfied:

$$0.5/f_I < |\phi_{AX}| < 2/f_I$$

$$1.5\nu_{AN} < \nu_{AP}$$

where $\phi_{AX}$ denotes its refractive power, $f_I$ the focal length of said first lens component, $\nu_{AP}$ the mean value of the Abbe numbers of the glasses of the positive lens in said $1_A$-th lens group, and $\nu_{AN}$ the mean value of the Abbe numbers of the glasses of the negative lenses in said $1_A$-th lens group.

4. In a zoom lens in which zooming is effected by simultaneously moving a plurality of movable lens components located on the image side of a front lens component, the improvement comprising that said front lens component has a positive power and includes a positive sub-component and a negative sub-component arranged from the object to the image side, wherein the zooming is effected by moving said movable lens components, whereby the front component remains immovable, while the focusing is effected by moving the negative sub-component, whereby the positive sub-component is fixed, said zoom lens satisfying the following conditions:

$$1.5\, fA < |fB| < 4fA$$

wherein fA is the focal length of the positive sub-component and fB is the focal length of the negative sub-component.

5. A zoom lens according to claim 4, wherein said negative sub-component includes a positive lens and a negative lens.

6. A zoom lens according to claim 4, further comprising a rear lens component arranged on the image side of the movable lens component and to be fixed during zooming and focusing.

7. In a zoom lens in which zooming is effected by simultaneously moving a plurality of movable lens components located on the image side of a front lens component, the improvement comprising that said front lens component has a positive power and includes a positive sub-component and a negative sub-component arranged from the object to the image side and the negative sub-component is moved to effect focusing and the following condition is satisfied $$1.5\, fA < |fB| < 4fA$$

wherein fA is the focal length of the positive sub-component and fB is the focal length of the negative sub-component.

8. A zoom lens according to claim 7, wherein said negative sub-component includes a positive lens and a negative lens.

9. A zoom lens according to claim 7, further comprising a rear lens component arranged on the image side of the movable lens components and to be fixed during zooming and focusing.

10. In a zoom lens in which zooming is effected by simultaneously moving a plurality of movable lens components located on the image side of a front lens component, the improvement comprising that said front lens component has a positive power and includes a positive sub-component and a negative sub-component arranged from the object to the image side, wherein the zooming is effected by moving said movable lens components, whereby said front component remains immovable, while the focusing is effected by moving the negative sub-component and the following condition is satisfied $$1.5\, fA < |fB| < 4fA$$

wherein fA is the focal length of the positive sub-component and fB is the focal length of the negative sub-component.

11. A zoom lens according to claim 10, wherein said negative sub-component includes a positive lens and a negative lens.

12. A zoom lens according to claim 10, further comprising a rear lens component arranged on the image side of the movable lens components and to be fixed during zooming and focusing.

13. A zoom lens comprising:
(a) a front component having a positive power, said front component consisting of a positive sub-component and a negative sub-component from the image side to the object side;
(b) a plurality of lens components arranged on the image side of said front component, wherein at the time of zooming, the distance between said two sub-components is fixed, while the distance between said front component and said lens components is changed, while at the time of focusing the said positive-sub-component is fixed, while said negative sub-component is moved along the optical axis, said zoom lens satisfying the following conditions:

$$1.5\, fA < |fB| < 4fA$$

wherein fA is the focal length of the positive sub-component and fB is the focal length of the negative sub-component.

14. A zoom lens according to claim 13, wherein said negative sub-component includes a positive lens and a negative lens.

15. A zoom lens according to claim 13, further comprising a rear lens component arranged on the image side of the movable lens component and to be fixed during zooming and focusing.

* * * * *